US010397082B2

(12) United States Patent
Kagan et al.

(10) Patent No.: US 10,397,082 B2
(45) Date of Patent: Aug. 27, 2019

(54) INTERNET INFRASTRUCTURE MEASUREMENT METHOD AND SYSTEM ADAPTED TO SESSION VOLUME

(71) Applicant: Cedexis, Inc., Portland, OR (US)

(72) Inventors: Martin Kagan, Portland, OR (US); Jacob Wan, Victoria (CA)

(73) Assignee: Citrix Systems, Inc., Fort Lauderdale, FL (US)

( * ) Notice: Subject to any disclaimer, the term of this patent is extended or adjusted under 35 U.S.C. 154(b) by 553 days.

(21) Appl. No.: 14/454,698

(22) Filed: Aug. 7, 2014

(65) Prior Publication Data

US 2016/0043923 A1    Feb. 11, 2016

(51) Int. Cl.
*H04L 12/24* (2006.01)
*H04L 12/26* (2006.01)
*H04L 29/08* (2006.01)

(52) U.S. Cl.
CPC ...... *H04L 43/0876* (2013.01); *H04L 41/0816* (2013.01); *H04L 41/142* (2013.01); *H04L 43/04* (2013.01); *H04L 67/02* (2013.01); *H04L 67/14* (2013.01)

(58) Field of Classification Search
CPC ..... H04L 43/50; H04L 43/10; H04L 43/0876; H04L 41/046; H04L 41/142; G06F 11/2294; G06F 11/3688
USPC ........................................ 709/205, 220, 224
See application file for complete search history.

(56) References Cited

U.S. PATENT DOCUMENTS

| 4,592,086 | A   | * | 5/1986  | Watari      | G10L 15/12   |
|-----------|-----|---|---------|-------------|--------------|
|           |     |   |         |             | 704/238      |
| 7,917,647 | B2  | * | 3/2011  | Cooper      | H04L 41/046  |
|           |     |   |         |             | 370/229      |
| 9,385,988 | B2  |   | 7/2016  | Kagan       |              |
| 9,553,844 | B2  |   | 1/2017  | Kagan       |              |
| 2001/0021176 | A1 | * | 9/2001 | Mimura      | H04L 1/0026  |
|           |     |   |         |             | 370/235      |
| 2002/0032717 | A1 | * | 3/2002 | Malan       | H04L 12/2602 |
|           |     |   |         |             | 718/105      |
| 2002/0078225 | A1 | * | 6/2002 | Pines       | H04L 12/2602 |
|           |     |   |         |             | 709/234      |
| 2004/0003022 | A1 | * | 1/2004 | Garrison    | G06F 9/5066  |
|           |     |   |         |             | 718/105      |
| 2004/0105392 | A1 | * | 6/2004 | Charcranoon | H04L 41/5003 |
|           |     |   |         |             | 370/252      |
| 2004/0258072 | A1 | * | 12/2004 | Deforche   | H04L 47/527  |
|           |     |   |         |             | 370/395.4    |
| 2005/0148314 | A1 | * | 7/2005 | Taglienti   | H04L 12/14   |
|           |     |   |         |             | 455/403      |
| 2006/0217931 | A1 | * | 9/2006 | Klaffenbach | G06F 1/28    |
|           |     |   |         |             | 702/187      |
| 2008/0144519 | A1 | * | 6/2008 | Cooppan     | H04L 43/0817 |
|           |     |   |         |             | 370/252      |

(Continued)

*Primary Examiner* — Ranodhi Serrao
*Assistant Examiner* — James N Fiorillo
(74) *Attorney, Agent, or Firm* — Klarquist Sparkman, LLP

(57) ABSTRACT

The technology disclosed relates to refined survey of Internet infrastructures. A pattern of measurements is disclosed that can improve data collection by increasing the number of measurements per survey session according to a function described in areas that have few measurements, and decreasing the average number of measurements per session in heavily measured areas. These are new problems that arise from implementation of technology developed by these inventors and their colleagues.

20 Claims, 2 Drawing Sheets

(56) References Cited

U.S. PATENT DOCUMENTS

| | | | |
|---|---|---|---|
| 2008/0222251 A1* | 9/2008 | Parthasarathy | A61B 5/0002 709/205 |
| 2010/0135186 A1* | 6/2010 | Choong | H04L 41/12 370/253 |
| 2010/0235144 A1* | 9/2010 | Mosberger-Tang | G01D 4/004 702/188 |
| 2011/0149949 A1* | 6/2011 | Bakshi | H04L 12/66 370/352 |
| 2011/0270975 A1* | 11/2011 | Troup | G06F 11/2294 709/224 |
| 2012/0277636 A1* | 11/2012 | Blondheim | A61B 5/11 600/595 |
| 2012/0324113 A1* | 12/2012 | Prince | H04L 67/2814 709/226 |
| 2013/0011432 A1* | 1/2013 | Crystal | A61K 39/0013 424/196.11 |
| 2014/0016479 A1* | 1/2014 | Coomber | H04L 12/413 370/241.1 |
| 2014/0031027 A1* | 1/2014 | Dalsgaard | H04W 36/30 455/418 |
| 2014/0130039 A1* | 5/2014 | Chaplik | G06F 9/45558 718/1 |
| 2014/0143410 A1* | 5/2014 | Ur | G06F 11/3466 709/224 |
| 2014/0143438 A1 | 5/2014 | Kagan | |
| 2014/0276114 A1* | 9/2014 | Maeda | A61B 5/0082 600/479 |
| 2014/0290357 A1* | 10/2014 | Zhang | G01F 23/246 73/295 |
| 2014/0379902 A1* | 12/2014 | Wan | H04L 41/142 709/224 |
| 2015/0088026 A1* | 3/2015 | Averina | A61B 5/0538 600/547 |
| 2015/0106499 A1* | 4/2015 | Venkata Naga Ravi | G06Q 30/02 709/224 |
| 2015/0133152 A1* | 5/2015 | Edge | G01S 5/0236 455/456.1 |
| 2015/0215267 A1 | 7/2015 | Kagan | |
| 2015/0304191 A1* | 10/2015 | Groenendijk | H04L 41/5032 370/252 |
| 2015/0339736 A1* | 11/2015 | Bennett | G06Q 30/016 705/306 |
| 2016/0007210 A1* | 1/2016 | Batteram | H04W 16/18 455/449 |
| 2016/0043923 A1* | 2/2016 | Kagan | H04L 43/0876 709/224 |
| 2016/0262073 A1* | 9/2016 | Muley | H04L 43/0876 |

* cited by examiner

INTERNET INFRASTRUCTURE MEASUREMENT METHOD AND SYSTEM ADAPTED TO SESSION VOLUME

RELATED NON-PRIORITY APPLICATIONS

This application is related to and incorporates by reference the following commonly owned applications: U.S. application Ser. No. 13/502,100 published as US 2012-0246290 A1 entitled "DNS Application Server", which is a section 371 national stage of PCT PCT/US10/51720, which claims the benefit of U.S. Prov. App. No. 61/251,136 (hereinafter '290 publication); U.S. application Ser. No. 13/502,106 published as US2012/0246315A1 entitled "Internet Infrastructure Survey" (hereinafter '315 publication), which is a section 371 national stage of PCT PCT/US10/55145, which claims the benefit of U.S. Prov. App. No. 61/258,042; and U.S. application Ser. No. 13/882,153 entitled "Surrogate Name Delivery Network", which is a section 371 national stage of PCT PCT/US11/57743, which claims the benefit of U.S. Prov. App. No. 61/258,042.

BACKGROUND

Field

The technology disclosed relates to refined survey of Internet infrastructures, building on the technology described in '315 publication. In particular, a pattern of measurements is disclosed that improves data collection.

Related Art

In the Internet Infrastructure Survey '315 publication, these inventors disclosed using survey code to measure different aspects of access quality. Little or nothing was said about how many samples to take. That practical issue arose as a result of adoption of the survey technology disclosed.

With adoption of technology previously disclosed, opportunities have arisen to refine and improve on use of survey code to collect access quality measurements.

DETAILED DESCRIPTION

Figure 1:
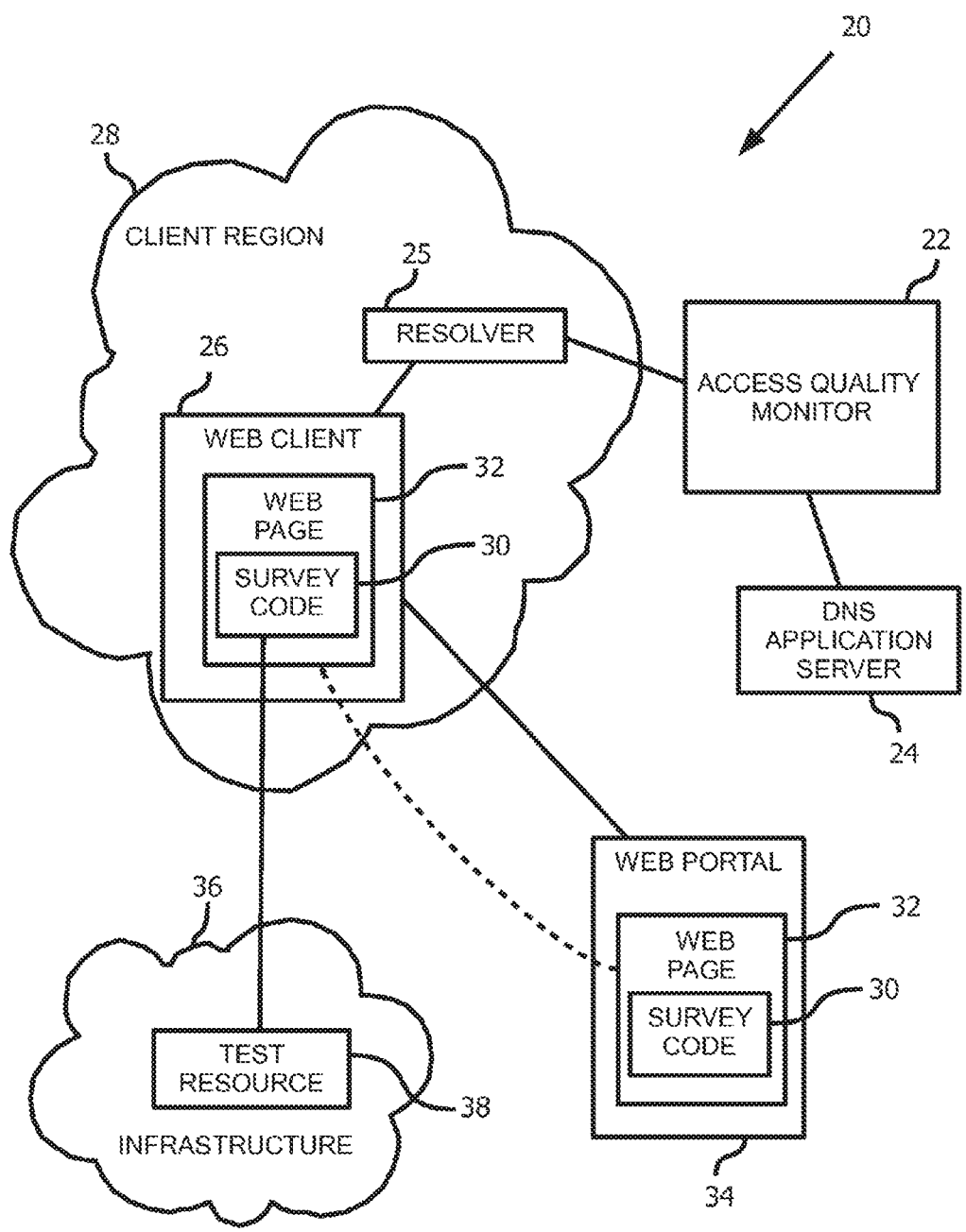
FIG. 1 depicts a survey environment in which adjustment of the number of measurements taken can be applied.

The following detailed description is made with reference to the figures. Preferred embodiments are described to illustrate the technology disclosed, not to limit scope, which is defined by the claims. Those of ordinary skill in the art will recognize a variety of equivalent variations on the description that follows. A detailed description of implementations of the technology disclosed is provided with reference to the FIGS. 1-4.

Survey code runs, for instance, on web pages requested by web clients. Alternatively, it can run on mobile apps that retrieve content via the Internet. When a web page invokes a survey code, such as by running a JavaScript routine, measurements are taken of access from the web client to a test resource running on a target infrastructure. The survey code can be configured to take any number of measurements.

Survey code now running can take billions of measurements per day. Two issues arise from the number of measurements now available. For sparsely measured request locations, such as underdeveloped counties and rural areas, can the number of measurements collected be increased? For densely measured locations, such as major cities, can the number of measurements be decreased without loss of significant information?

This application discloses that survey code can be modified to reflect the origin of a web page request. The request will prompt a download of survey code that is finely tuned to reflect the origin of the request. The number of measurements in sparsely measured request locations can be increased by modifying the survey code to reflect the origin of a web page request. More complete data can be assembled from added samples. Conversely, a point of diminishing returns on measurement can be selected for densely measured locations. Enough measurements can be collected to reflect dynamic changes in responsiveness without collecting nearly as many measurements as originally collected using the survey codes previously described. Traffic can be reduced and/or performance can be increased by determining a baseline number of samples and adjusting that number up or down.

Both goals can be served by relating the average number on measurements M taken by survey code deployed to a request location based, at least in part, on the number of survey sessions per day originating from the request location.

In one example, all requests from a particular ISP (e.g., Orange in France) are taken as a group for purposes of calculating the number of survey sessions per day. Suppose that the ISP and target resources of interest, when measured at a rate of three measurements per session, yields nearly 100 million measurements per day from 32 million survey sessions. Suppose that 16 million measurements per day would provide completely sufficient measurement coverage to evaluate performance between request locations throughout this ISP's territory and the test resources of interest. Adjusting the survey code running for users of this particular ISP would reduce the amount of measurement traffic generated and the amount of reporting of measurements, as only half of the survey sessions would need to make even one measurement.

In another example, a small ISP has widely disbursed users, say in the Czech Republic. Because most of the target resources of interest are not available in the Czech Republic, suppose that only 100 sessions a day provide measurement opportunities. Given the infrastructure that carries the ISP's traffic, 300 measurements per day is not enough to keep up with changing performance between request locations throughout the ISP's territory and test resources of interest. With just 100 sessions per day, measurement may always be thinner than the ideal, but increasing the number of measurements from 3 to 7 per session is helpful.

The technology disclosed uses a function of the number of sessions per period, such as per week, day, or hour, from an ISP to determine the average number of measurements that will be taken during a session. One such function is logarithmic:

$$M = F - \log_{10}(\text{sessionsPerDay})$$

$$F = 8$$

Thus, if there is an ISP with 32 million sessions per day:

sessionsPerDay=32,000,000

$7.5 = \log_{10}(32{,}000{,}000)$ $0.5 = 8 - \log_{10}(32{,}000{,}000)$

That is, suppose a reference factor F is set to 8. The large ISP has 32 million sessions a day during which measurements can be collected. This function of the number of ISP sessions leads to selecting one half (0.5) as the average number M of measurements per session.

Measurement in one half of the survey sessions can be implemented as a function of any phenomena measurable by the survey code that is random or pseudo random. A time stamp precise to milliseconds is available; a sample reading from a timestamp clock might be sufficiently random for purposes of deciding whether to take a reading. The integer part of M can be used directly. That is, if <=1.5, then one reading could always be taken. The fractional part of M can be compared to the random reading to decide whether a fractional measurement would be satisfied by a reading during a current session. For instance:

$M = 0.5$ clock=420 ms

420/1000<0.5

∴ fractionalSample=True

In this example, sampled times less than 500 milliseconds would result in taking a sample during the present session and sampled times between 500 and 999 milliseconds would not.

Other parts of a clock reading can be used; or part of a wireless transmission code can be used. A pseudo-random sequence generator can be used; or part of a value in some register can be used. In general, any numerical reading that consistently tends toward a random distribution, when sampled, can be used. The number of milliseconds or microseconds returned from a clock when person presses the spacebar is an example of a numerical reading that tends to be random and uniformly distributed. The simplest random distribution, which can be used with the inequality above, is a uniform distribution. Other random distributions can be mapped to a probability with an additional transformation.

The request location can be a logical or physical location. A logical location is, for instance, region, a country, a provider or an autonomous system (AS). It also can be a geo market location or geo country location. It can be an IP address block. A physical location can be determined in any conventional manner.

For some factor F, evaluation of the number of sessions would lead to a determination that three measurements should be taken per session. With increasing numbers of sessions per day, the average number of measurements would taper off. With decreasing numbers of sessions per day, the average number of measurements would approach the value of the factor F, such as F=8. It may be desirable to take more measurements per user, on average, in dense populations or for large ISPs, because the users tend to be more sophisticated and the number of target resources of interest may increase.

The logarithmic function above can be taken to a base other than 10. Another asymptotic function can be used such as a variation on xy=1, which can be expressed as y=1/x. A lookup table can be used directly or with interpolation.

Two or more piecewise functions can be combined to determine the average number of measurements per session. For instance, above a threshold, the logarithmic function can be used and below the threshold a step function can be used. The step function could more rapidly increase the average number of measurements as the number of sessions per day or other period diminishes.

Functions that return a desired number of measurements can be tempered by or be made subject to a maximum limit established by the operator of a web site that delivers survey code. For instance, the web site operator and client of the measurement service provider could set a limit of no more than five measurements per session, out of fear that the measurements would impair the customer's experience at the web site.

The number of sessions per day can be based on a smaller territory than a whole ISP. For instance, it can be based on a dynamic IP block known to be used in a particular geographic area, such as California.

The factor F can be a function of the territory from which the number of sessions per day is calculated. An ISP that covers widely disbursed areas could have a higher factor F than one that covers a single region. The factor F also can be a function of the number of target resources of interest for the territory or ISP. A territory or ISP that has more sophisticated users may have more targets of interest and require more measurements, on average, per user.

FIG. 1 depicts an example survey environment in which adjustment of the number of measurements taken can be applied. This environment was previously disclosed in the Internet Infrastructure Survey application. FIG. 1 is an illustrative schematic diagram of a system 20 including an Access Quality Monitor (AQM) 22. AQM 22 is a DNS nameserver registered as authoritative for a domain, such as aqm.net. The AQM is configured to process DNS queries, in particular DNS queries to resolve Fully Qualified Domain Names (FQDNs) that encode indicators of access quality.

An FQDN that encodes an access quality indicator is referred to as a pseudo-hostname. A pseudo-hostname generally includes two parts. One part is a domain name for which an AQM, such as AQM 22, is authoritative (i.e., the domain name aqm.net in the given scenario). The other part of the pseudo-hostname is a key string including an access quality indicator. For the sake of illustration, an access quality indicator may have a value of 2314, which may represent a communication delay of 231.4 milliseconds. A pseudo-hostname encoded with the indicator may be 2314.aqm.net. Additional information may be included in the key string, such as identifiers of the infrastructure and resource that were accessed, as well as the type of access quality that was measured. As described hereinabove, an exemplary pseudo-hostname including the "rtt" access quality type would be rtt.2314.aqm.net.

Pseudo-hostnames are generated to conform to FQDN specifications, such as a length limit of 255 bytes, as specified in IETF RFC 2181. The AQM is configured such that upon receiving a DNS query to resolve a pseudo-hostname, the indicator of access quality is extracted and processed. Because the access quality indicator is received within a DNS query, the communication of the indicator avoids the time delay required for IP resolution in many typical forms of Internet client/server communications. Furthermore, some of the load of communications may be reduced using resolver caching.

The AQM may also implement functions of a Data Survey Server, as disclosed in '290 publication, which is assigned to the inventor of the present invention, and which is incorporated herein by reference in its entirety. '290 publication discloses a Data Survey Server that communicates access quality data to a DNS Application Server, shown in FIG. 1 as DNS Application Server 24. Data may be communicated by the AQM as a continuous, synchronous or asynchronous data stream, or may be communicated on demand, that is, when requested by the DNS Application Server or another data requester. The DNS Application Server 24 directs access by web clients to infrastructures based on access quality data. Alternatively or additionally, the AQM 22 may implement functions of the DNS Application Server 24, including the function of directing access.

In an illustrative scenario, AQM 22 receives a DNS query including a pseudo-hostname from a resolver 25, the DNS query having been initiated by a web client 26. Web client 26 may be a web browser, such as Microsoft Internet Explorer or Google Chrome, which supports dynamically executable code, such as JavaScript. The DNS query is generally transmitted by means of a User Datagram Protocol (UDP), but may also be transmitted by Transmission Control Protocol (TCP). Transmitted messages generally include an IP address of the resolver. In some embodiments, the AQM 22 may be configured to correlate the resolver address to a client region 28. Client region 28 may be an IP network, such as an Autonomous System (AS), as described in IETF RFC 1930, which is often a network managed by an Internet Service Provider (ISP). Alternatively or additionally, the correlation of a client region may be to a geographic region, such as a city, country, or continent.

In embodiments of the present invention, web client 26 executes a survey code 30, which generates the DNS query including the pseudo-hostname. Typically, survey code is a form of Dynamic HTML (DHTML) code that executes within a web page 32. The illustrated web page can, alternately, be content loaded into a mobile app.

In general, web page 32 provides a service or includes content that is unrelated to the operation of the survey code, and the survey code is configured to run within the web client in parallel with the execution of the web page service or content. The execution of the survey code is generally transparent to a user of the web client.

The web client may receive the web page from a web portal 34. Web portal 34 is understood to be a system of software and hardware configured to provide resources requested using Hypertext Transfer Protocol (HTTP) or by other Internet access protocols, such as file transfer and streaming media protocols. Resources accessible from the web portal may be physically maintained within one or more Internet infrastructures, including an infrastructure 36. Similarly, an app may receive content using an appropriate protocol.

The survey code 30 is configured with instructions for determining a measure of access quality associated with accessing a resource such as a test resource 38 at infrastructure 36. Test resource 38 may be any type of Internet resource that when accessed returns a message or other form of content to the web client. In one embodiment, the test resource may be a JavaScript code. Examples of the survey code, encoded in JavaScript, and the test resource, also a JavaScript code, are shown in the Appendix of the application incorporated by reference.

In an illustrative scenario, the measure of access quality may be a time delay associated with accessing the test resource. A time delay may include one or more of the following: a response, or "round-trip" time (an elapsed time between sending a transmission requesting a resource and receiving a response); a connect time (such as a time to make an IP connection, an SSL connection, or a connection to a transaction application server); and a time between transmission bytes (i.e., a speed of transmission, typically measured in bytes/sec).

Because some infrastructures, particularly CDNs, cache resources from primary, or "origin" sources, a further measure of access quality may be a measure of a time delay of a second access of the test resource, thereby measuring access quality when the test resource is in a CDN cache.

Additional measures of access quality may be an error or data corruption rate (such as percent of bad bytes or bad packets, or rate of packet loss), a connection variability or jitter (such as variability of transmission speed or error rate), and a measure of availability (an indicator of whether or not a connection or service was completed).

The survey code may be configured to measure different aspects of access quality when accessing different types of resources. For example, transmission time and jitter may be measured for relatively large files, such as files greater than ten kilobytes, whereas measures of availability and connect time may be measured when accessing resources that provide short response messages. Jitter may be especially relevant for an audio or video streaming resource.

Access quality encountered by the web client when accessing the test resource at the infrastructure is generally similar to access quality encountered by other web clients in the client region, to the extent that the access quality is a function of network and infrastructure performance. A profile of access quality generated by the AQM generally represents access quality from a region to a given infrastructure.

Figure 2:
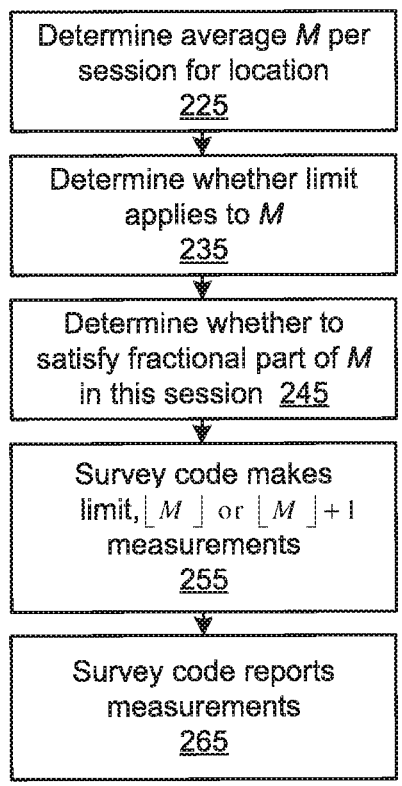
FIG. 2 is a flowchart of taking a number of measurements on average and during a particular measurement session.

FIG. 2 is a high level flowchart of taking a number of measurements on average and during a particular measurement session. Each of the steps is implemented by special purpose hardware or special purpose firmware or software running on a processor. The steps can be restated as fewer or more steps than illustrated in the flowchart, to the same effect. The order of the steps can be changed with the same effect. In some implementations, there will not be any applicable ceiling or the process will depend only on the applicable ceiling. For convenience, the flowchart is described with respect to software running on a processor making the calculations and applying the logic described. However, the method need not use this particular hardware configuration.

In FIG. 2, the method begins in step 225 with a processor determining an average number M of measurements per session for a location. More detail is provided in discussion of FIG. 3, below.

In step 235, a processor determines whether a limit applies to M that restricts or sets a maximum number of measurements per session. This limit can be imposed by a content provider who has agreed for survey code to run from the content that they supply; for instance, a measurement JavaScript that is loaded with the content provider's web page. The measurement JavaScript is either configured using a limit or it includes steps that compare the limit to the average number M of measurements and lowers the number of measurements if required by the limit.

In step 245, a processor determines whether to satisfy the fractional part of M in a particular measurement session, as further described with reference to FIG. 4.

In step 255, the sample code makes a number of measurements that corresponds to the limit $\lfloor M \rfloor$ or $\lfloor M \rfloor +1$. Not shown in the flowchart is delivery of the survey code with the webpage or content of an app to a web client. As indicated above, steps 225-245 can be performed on the server side while preparing the survey code for download or can be implemented in JavaScript or some other language using the parameters received with the webpage or content of an app.

In step 265, the survey code reports, or the access quality monitor receives, measurements made by the survey code. These measurements can be used as described in this application and the prior applications that are incorporated by reference.

Figure 3:
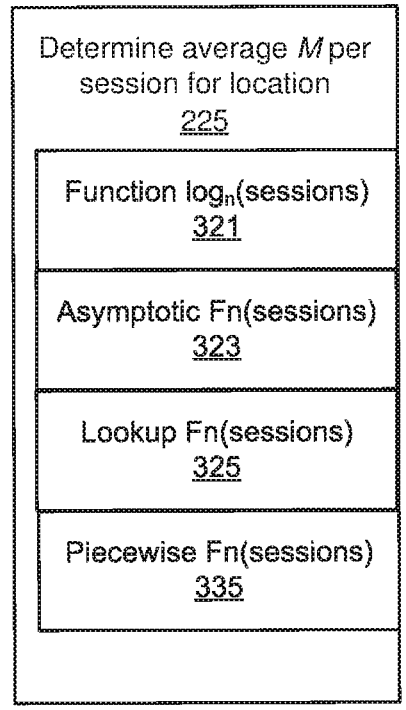
FIG. 3 illustrates alternatives for determining an average number M of measurements per session for a location.

FIG. 3 illustrates alternatives for determining an average number M of measurements per session for a location 225. The four alternatives illustrated are as described below. Alternative 321 uses a logarithmic function of a number of sessions. Alternative 323 uses some other asymptotic function of the number of sessions. Alternative 325 uses a lookup table. Alternative 335 uses a piecewise function, such as piecewise polynomial functions.

Figure 4:
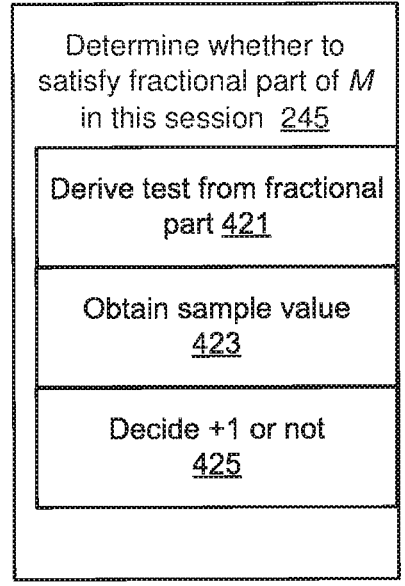
FIG. 4 illustrates determining whether to satisfy a fractional part of M while making measurements during a particular session.

FIG. 4 illustrates determining whether to satisfy a fractional part of M while making measurements during a particular session 245. Depending on how the average number M is calculated, it can have a fractional part, such as, 1.7. The fractional part of 1.7 indicates the proportion of measurement sessions in which more than one measurement should be taken. This can be treated as a probability that an additional measurement should be taken in a particular session. A sample from a random distribution can be used to implement the probability and determine whether to take $\lfloor M \rfloor$ or $\lfloor M \rfloor+1$ measurements. Computers present many opportunities to sample random or pseudorandom distributions, as described above. In this example, the sample can be scaled and compared to the fractional part 0.7 to determine whether or not an additional measurement will be taken in the particular session.

Generally, determining whether to satisfy a fractional measurement requirement begins with block 421 by deriving a test from a fractional part of the average number of measurements M. In the discussion above, the test derived from the fractional part 0.7 statistical test related to a random sample, such as the timestamp clock. Another test could rely on a pseudorandom code, such as one generated using a shift register.

In block 423, a random or pseudorandom sample values obtained.

In block 425, the sample value is compared to the test using a processor to decide whether or not to take an additional measurement in the particular session.

Additional Embodiments

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

In one implementation, a method is described that can be used to determine how many infrastructure performance measurements to take during a session. The method includes accessing an average number of measurements per session ("MPS") value and using an integer part of the MPS value to determine a base number of infrastructure performance measurements to take during the session. In this method, the infrastructure performance measurements are measured between a survey code running as part of the session and a target resource hosted by a particular infrastructure. The session includes delivery of a survey code from host web based content to a web client. The method includes comparing a fractional part of the MPS value to a random or pseudo random sample value and determining whether to satisfy the fractional part of the factor by taking an additional measurement during the session.

It can further include causing the base number of measurements plus an additional measurement, if so determined, to be taken.

This method and other implementations of the technology disclosed can each optionally include one or more of the following features.

The method can further include a variety of calculations to reach the MPS value. MPS value can be calculated using a logarithmic function of a number of measurement sessions in a time period. The number of measurement sessions can be per day in a request grouping that includes the web client. The MPS value can be calculated using an asymptotic function of number of sessions in a time period. The MPS value can be taken from a table that uses number of sessions in a time period as a lookup index.

Either the web client or the server that provides the survey code to the web client can evaluate the MPS value and determine whether a fractional part is satisfied in a particular measurement session. The method can further include the random or pseudo random sample value being accessed and compared to the fractional part of the MPS value by the survey code running on the web client. It can include the random or pseudo random sample value being accessed and compared to the fractional part of the MPS value prior to delivery of the survey code to the web client and the survey code reflecting whether to satisfy the fraction part during the session.

The method can be extended from the perspective of the web client or a resolver that receives measurement data from the web client. It can include receiving from the web client a number of measurements responsive to the base number and the determination of whether to satisfy the fractional part. It can include the web client transmitting to an access quality monitor a number of measurements responsive to the base number and the determination of whether to satisfy the fractional part.

Other implementations can include a client device running the web client, a system providing survey code to the web client and/or receiving measurements transmitted from the web client, and a computer program product that tangibly embodies instructions executable by those devices or systems or that, when combined with suitable hardware, produces the devices or systems.

What is claimed is:

1. A method of taking internet infrastructure performance measurements during an internet session, the method variably adapted to session volume in served areas, and comprising:

by one or more processors:
    determining, for a requesting location of a web client, an average number of the internet infrastructure performance measurements to be taken per session ("MPS"), the average number of the MPS comprising an integer part and a non-zero fractional part;
    wherein the internet infrastructure performance measurements are time delays measured by executing a survey code running as part of the internet session and each of the internet infrastructure performance measurements comprises:
        sending a network transmission comprising a resource request;

receiving a corresponding response from a target resource hosted by a particular infrastructure; and obtaining the corresponding measured time delay from the received response; and wherein the internet session includes delivery of the survey code from a host web based content to a web client;

using the integer part as a base number of the infrastructure performance measurements to take during the internet session;

based on the determining, modifying the survey code to reflect the requesting location;

comparing the fractional part to a random or pseudo random sample value and further determining whether to satisfy the fractional part by taking an additional one of the internet infrastructure performance measurements during the internet session; and causing the base number of the internet infrastructure performance measurements plus, in at least one case, the additional one internet infrastructure performance measurement, to be taken during the session.

2. The method of claim 1, wherein the determining the MPS comprises calculating the average number of the MPS using a logarithmic function of a number of measurement sessions in a time period.

3. The method of claim 1, wherein the determining the average number of the MPS comprises calculating the average number of the MPS using a logarithmic function of a number of measurement sessions per day in a request grouping that includes the web client.

4. The method of claim 1, wherein the determining the average number of the MPS comprises calculating the average number of the MPS using an asymptotic function of a number of sessions in a time period.

5. The method of claim 1, wherein the determining the average number of the MPS comprises taking the average number of the MPS from a table that uses a number of sessions in a time period as a lookup index.

6. The method of claim 1, wherein the comparing is performed by the survey code running on the web client.

7. The method of claim 1, further including receiving from the web client a number of measurements responsive to the base number and the determination of whether to satisfy the fractional part.

8. The method of claim 1, further comprising transmitting, from the web client to an access quality monitor, a number of measurements responsive to the base number and the determination of whether to satisfy the fractional part.

9. The method of claim 1, further comprising causing the taken internet infrastructure performance measurements to be transmitted from the web client to an access quality monitor.

10. A system for providing internet infrastructure performance measurements, taken during an internet session, to an access quality monitor, the system comprising:

a processor and memory coupled to the processor, the memory storing program instructions that, when executed on the processor, cause the processor to:

determine an average number of the internet infrastructure performance measurements to be taken per session ("MPS value"), the MPS value comprising an integer part and a fractional part;

wherein the internet infrastructure performance measurements are time delays measured by executing a survey code running as part of the internet session and each of the internet infrastructure performance measurements comprises:

sending a network transmission comprising a resource request;

receiving a corresponding response from a target resource hosted by a particular infrastructure; and determining the corresponding measured time delay from the received response; and wherein the internet session includes delivery of the survey code from a host web based content to a web client;

use the integer part as a base number of infrastructure performance measurements to take during the internet session;

compare the fractional part to a random or pseudo random sample value and further determine whether to satisfy the fractional part by taking an additional one of the internet infrastructure performance measurements during the internet session;

modify, based on the comparing and the further determining, the survey code to reflect whether to satisfy the fractional part during the internet session; and cause the base number of the internet infrastructure performance measurements plus, in at least one case, the additional one internet infrastructure performance measurement to be taken during the session; and cause a number of the taken internet infrastructure performance measurements, responsive to the base number and the further determining, to be transmitted from the web client to the access quality monitor.

11. The system of claim 10, wherein the program instructions cause the processor to determine the MPS value by calculating the MPS value using a logarithmic function of a number of measurement sessions per day in a request grouping that includes the web client.

12. The system of claim 10, wherein the program instructions cause the processor to determine the MPS value comprises calculating the MPS value using an asymptotic function of a number of sessions in a time period.

13. The system of claim 10, wherein the program instructions cause the processor to determine the MPS value comprises taking the MPS value from a table that uses a number of sessions in a time period as a lookup index.

14. The system of claim 10, wherein the processor is further caused to receive from the web client a number of measurements responsive to the base number and the further determination of whether to satisfy the fractional part.

15. A computer readable program product comprising one or more non-transitory computer-readable media that tangibly embodies instructions that, when executed by at least one processor, cause internet infrastructure performance measurements to be taken during a session, with a reduction of measurement traffic in areas of high session volume, the measurements being taken by:

determining an average number of the internet infrastructure performance measurements to be taken per session ("MPS"), the average number having an integer part and a fractional part;

wherein the internet infrastructure performance measurements are time delays measured by executing a survey code running as part of the internet session and each of the internet infrastructure performance measurements comprises:

sending a network transmission comprising a resource request;

receiving a corresponding response from a target resource hosted by a particular infrastructure; and determining the corresponding measured time delay from the received response; and wherein the internet session includes delivery of the survey code from a host web based content to a web client using the integer part as a base number of infrastructure performance measurements to take during the internet session;

causing the survey code running on the web client to compare the fractional part to a random or pseudo random sample value and further determine whether to satisfy the fractional part by taking an additional one of the internet infrastructure performance measurements during the internet session;

causing the base number of the internet infrastructure performance measurements plus, in at least one case, the additional one internet infrastructure performance measurement, to be taken during the session; and causing a number of the taken internet infrastructure performance measurements, responsive to the base number and the further determining, to be transmitted from the web client to an access quality monitor.

16. The computer readable program product of claim 15, wherein the determining the average number comprises calculating the average number using a logarithmic function of a number of measurement sessions in a time period.

17. The computer readable program product of claim 15, wherein the determining the average number comprises calculating the average number using an asymptotic function of a number of sessions in a time period.

18. The computer readable program product of claim 15, wherein the determining the average number comprises taking the average number from a table that uses a number of sessions in a time period as a lookup index.

19. The computer readable program product of claim 15, further including receiving from the web client a number of measurements responsive to the base number and the determination of whether to satisfy the fractional part.

20. The computer readable program product of claim 15, wherein the determining the average number is based on a number of survey sessions per day originating from a requesting location of the web client.

* * * * *